(Model.)

I. P. WATSON.
FURROW ATTACHMENT FOR SEED PLANTERS.

No. 255,062. Patented Mar. 14, 1882.

United States Patent Office.

ISAAC P. WATSON, OF CLIFFORD, INDIANA.

FURROW ATTACHMENT FOR SEED-PLANTERS.

SPECIFICATION forming part of Letters Patent No. 255,062, dated March 14, 1882.

Application filed January 5, 1882. (Model.)

*To all whom it may concern:*

Be it known that I, ISAAC P. WATSON, of Clifford, in the county of Bartholomew and State of Indiana, have invented certain new and useful Improvements in Furrow Attachments for Seed-Planters; and I do hereby declare that the following is a full, clear, and exact description of the invention, which will enable others skilled in the art to which it appertains to make and use the same, reference being had to the accompanying drawings, which form a part of this specification.

Figure 1:
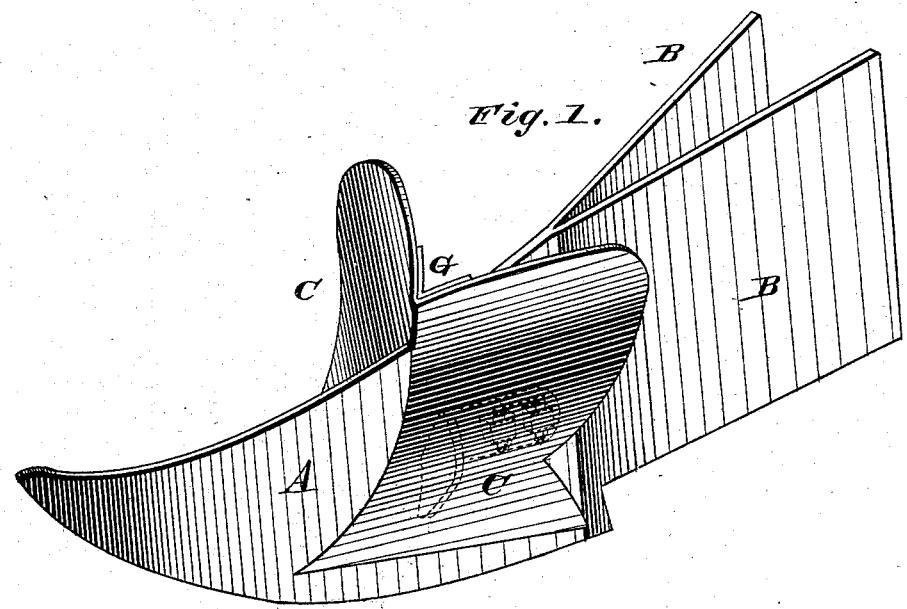
Figure 2:
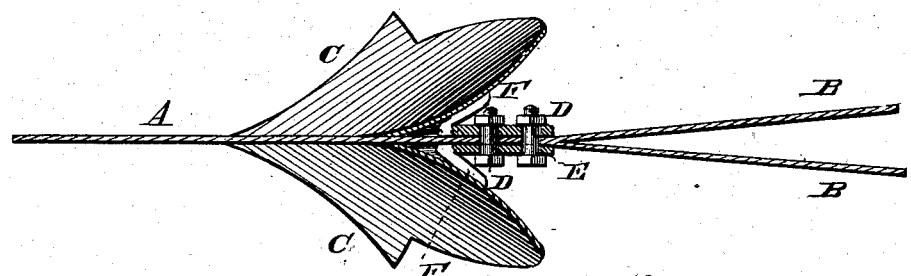
Figure 3:
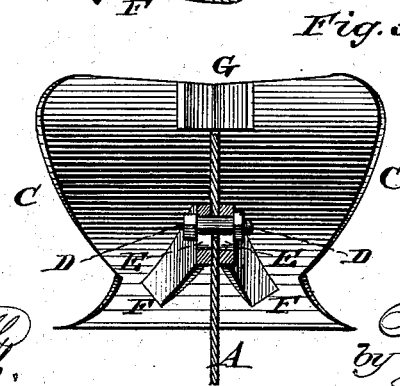

Figure 1 is a perspective view of my improved runner or furrow attachment for seed-planters. Fig. 2 is a horizontal sectional view of the same, and Fig. 3 is a vertical cross-section.

Corresponding parts in the several figures are denoted by like letters of reference.

This invention relates to furrow attachments for seed-planters, and is an improvement on the device for which Letters Patent of the United States No. 244,346 were granted to myself on the 12th day of July, 1881, as will be hereinafter fully described, and particularly pointed out in the claim.

In seed-planters of all kinds a serious objection is almost invariably encountered—viz., the runners or soil-openers will sink to an unequal depth in the land, which is frequently broken several weeks before planting, thus depositing the seeds at an unequal depth.

To remedy this difficulty was one object of my Letters Patent above referred to, and my present invention aims at an adjustment whereby the seeds may be deposited at any desired depth.

Another important function of my improvement is to remove from within a certain distance of the hill or rows any young sprouts of grass and weeds which, if allowed to grow, would choke and destroy the young plants.

The construction of my invention is as I shall now proceed more fully to describe, with reference to the drawings, in which—

A represents the runner, which is provided at its rear end with diverging blades B B.

C C are two flanges or mold-boards, secured to the sides of the runner by means of bolts D D, passing through said runner and through vertical slots E E in brackets F, attached to the inner sides of said flanges or mold-boards. The lower edges of the flanges or mold-boards C should be parallel to those of the blades B of the runner, and by the method of attachment just described they may be readily adjusted so as to regulate the depth at which it is desired to plant the seed.

The upper front edges of the mold-boards C may be connected by a bridge-piece, G, which insures their being always adjusted at an even height.

The runners are attached to the planter in the usual manner.

In operation the runners may sink in the soil to any depth, according to whether it may be hard or mellow; but the flanges or mold-boards C will always scrape away from the furrow any superfluous soil, leaving the seed practically planted at equal depth. By thus removing the superfluous soil the young sprouts of grass or weeds are also scraped away from the furrow, thus preventing these from choking the young plants when they begin to sprout.

Having thus described my invention, I claim and desire to secure by Letters Patent of the United States—

The combination of the runner A, having blades B B and bolts D, with the mold-boards C C, having brackets F, provided with vertical slots E, and the bridge-piece G, substantially as and for the purpose set forth.

In testimony that I claim the foregoing as my own I have hereto affixed my signature in presence of two witnesses.

ISAAC P. WATSON.

Witnesses:
GEORGE HUBBARD,
JAMES GODFREY.